United States Patent
Disser et al.

(10) Patent No.: US 7,826,952 B2
(45) Date of Patent: Nov. 2, 2010

(54) BRAKE CONTROL SYSTEM

(76) Inventors: Robert J. Disser, 1435 Cincinnati St., Dayton, OH (US) 45408; Jon T. Zumberge, 1435 Cincinnati St., Dayton, OH (US) 45408; Paul M. Degoul, 64 avenue de la Plaine de France, BP 65059 Tremblay en France, 95972 Roissy CDG Cedex (FR)

( * ) Notice: Subject to any disclaimer, the term of this patent is extended or adjusted under 35 U.S.C. 154(b) by 1445 days.

(21) Appl. No.: 11/101,318

(22) Filed: Apr. 7, 2005

(65) Prior Publication Data

US 2005/0278107 A1 Dec. 15, 2005

Related U.S. Application Data

(60) Provisional application No. 60/579,983, filed on Jun. 15, 2004.

(51) Int. Cl.
 *B60T 7/12* (2006.01)
(52) U.S. Cl. .............................. 701/70; 701/72; 701/78; 701/76
(58) Field of Classification Search ...................... 701/1, 701/29, 33, 34, 22, 48, 78, 81, 83, 76, 75, 701/77, 70, 72
See application file for complete search history.

(56) References Cited

U.S. PATENT DOCUMENTS

| | | | | |
|---|---|---|---|---|
| 5,193,061 A * | 3/1993 | Tsuyama et al. | .............. | 701/83 |
| 5,295,738 A * | 3/1994 | Matsuura et al. | ............ | 303/158 |
| 6,424,900 B2 * | 7/2002 | Murray et al. | ................ | 701/48 |
| 6,580,991 B2 * | 6/2003 | Disser et al. | .................. | 701/48 |
| 7,290,840 B2 * | 11/2007 | Tsunehara et al. | ............ | 303/11 |
| 7,349,772 B2 * | 3/2008 | Delaney et al. | ................ | 701/2 |

* cited by examiner

*Primary Examiner*—Richard M. Camby
(74) *Attorney, Agent, or Firm*—Dickinson Wright PLLC

(57) ABSTRACT

A system including a vehicle body having a plurality of wheels and a brake subsystem associated with each wheel. The system further includes a plurality of remote controllers, wherein each remote controller is associated with one of the brake subsystem and is configured to calculate basic braking functions for the associated brake subsystem and for each of the other brake subsystems. The remote controllers are operatively coupled together. The system further includes a central controller operatively coupled to each remote controller, wherein each remote controller has about the same or less processing capability than the central controller.

29 Claims, 2 Drawing Sheets

BRAKE CONTROL SYSTEM

This application claims priority to provisional application Ser. No. 60/579,983, filed Jun. 15, 2004, the entire contents of which are hereby incorporated by reference.

The present invention is directed to a brake control system, and more particularly, to a brake control system for an electromechanical or electrohydraulic brake system.

BACKGROUND

Electromechanical brake ("EMB") systems are attracting increasing interest for use in and with motorized vehicles. EMB systems and/or associated architecture systems are disclosed in U.S. Pat. No. 6,424,900 entitled Multi-Module Control-By-Wire Architecture issued Jul. 23, 2002 and in U.S. Pat. No. 6,580,991 entitled Electric Caliper Hardware Topologies for a Safety System issued Jan. 17, 2003. The entire contents of both of these patents are hereby incorporated herein by reference. Because such electromechanical brake systems rely exclusively upon electromechanical systems to control the brakes, the electromechanical system must include significant redundancies and backups. For example, electromechanical brake systems may have a controller associated with each brake subsystem located at the corner of the vehicle. It may be desired to have each corner controller carry out the full range of processing tasks associated with the associated brake subsystem, as well as each of the other brake subsystems. Each corner controller may also carry out higher-level braking or control tasks.

However, this type of arrangement requires relatively high computing power and through-put, and therefore requires four relatively expensive corner controllers. One or more central controllers may also be provided at the brake pedal to communicate driver pedal input to the brake control system over a data bus. Accordingly, there is a need for a control system for brakes which requires relatively low computing power and therefore has a relatively low cost, yet provides sufficient computing power and redundancies.

SUMMARY

In one embodiment, the present invention is a control system which provides sufficient computing power and redundancies for use in an electromechanical or electrohydraulic brake system, and which provides a relatively even distribution of computing responsibilities across its controllers. In particular, in one embodiment the present invention is a system including a vehicle body having a plurality of wheels and a brake subsystem associated with each wheel. The system further includes a plurality of remote controllers, wherein each remote controller is associated with one of the brake subsystem and is configured to calculate basic braking functions for the associated brake subsystem and for each of the other brake subsystems. The remote controllers are operatively coupled together. The system further includes a central controller operatively coupled to each remote controller, wherein each remote controller has about the same or less processing capability than the central controller.

DETAILED DESCRIPTION

Figure 1:
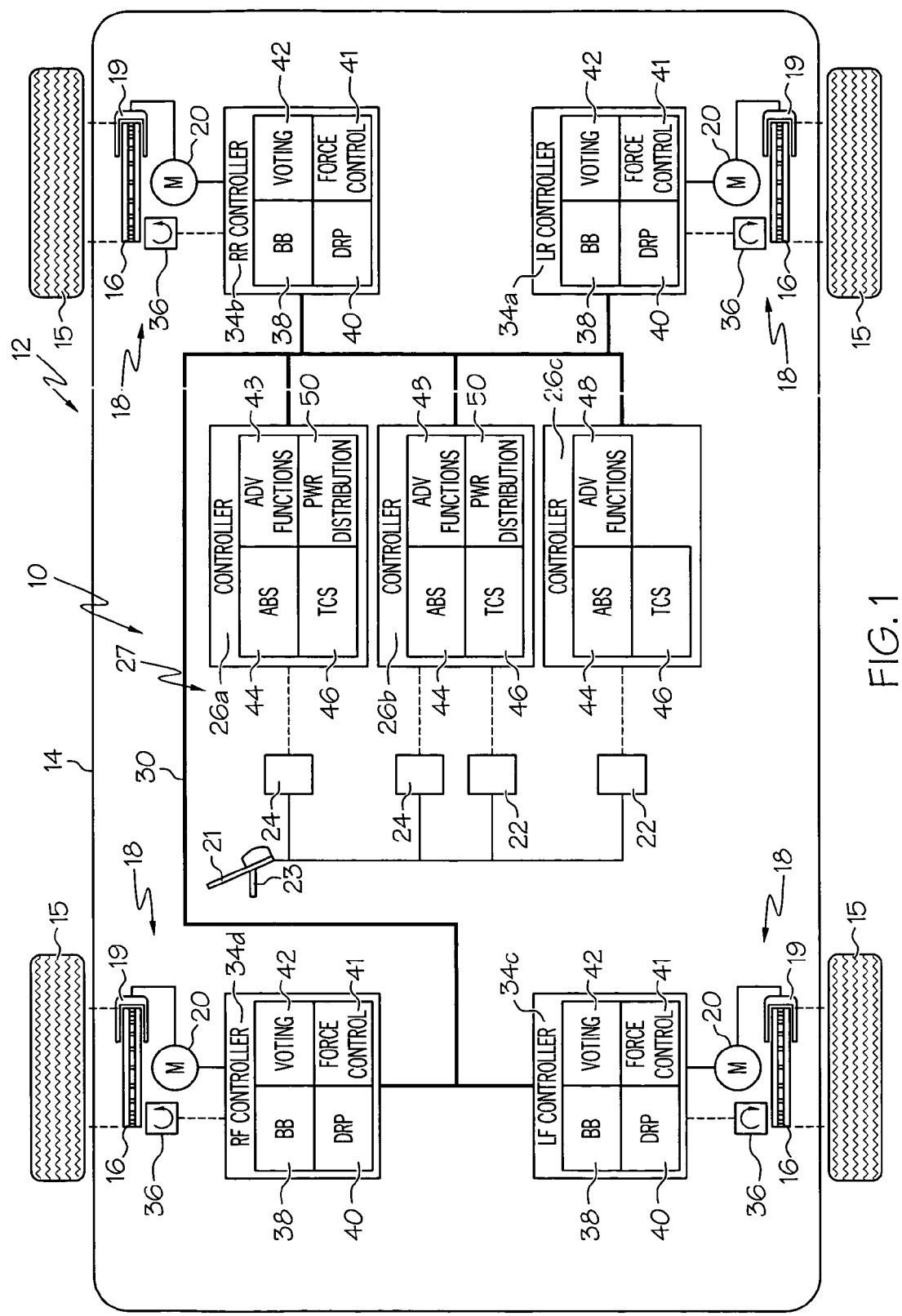
FIG. 1 is a schematic view of one embodiment of the system of the present invention.

The system of the present invention, generally designated 10, may be implemented in a vehicle 12 which includes a vehicle body 14. The invention may be implemented in vehicles utilizing a wide variety of braking systems, including braking system utilizing drum brakes and/or disk brakes, as well as other types of brakes. However, for discussion purposes below the vehicle 12 will be assumed to utilize disk brakes.

The vehicle 12 includes a set of wheels 15, with each wheel 15 being rigidly coupled to an associated rotor 16. Each rotor/wheel combination includes an associated brake subsystem 18. Each brake subsystem 18 may include a caliper 19 which is operatively coupled to a motor 20. The motor 20 is configured such that upon receiving an appropriate signal the motor 20 is activated to cause displacement of the associated caliper 19. The displacement of the caliper 19 causes a brake pad located thereon (not shown) to engage the rotor 16 of an associated wheel 15 in a well-known manner. Each brake subsystem 18 may therefore include a motor 20 operatively coupled to the associated caliper 19 to cause the desired displacement of the caliper 19.

The system 10 may include a brake pedal 21 that is operatively coupled to a pair of pedal position sensors 22 so that the pedal position sensors 22 can determine the position or displacement of the brake pedal 21. The brake pedal 21 is also operatively coupled to a pair of pedal force sensors 24 which can determine the acceleration or force of the pedal 21 when the pedal 21 is depressed by a driver. Thus the output of the pedal force sensors 24 provides information relating to the force applied to the brake pedal 21 by the user.

Each pedal sensor 22, 24 is coupled to a central controller 26a, 26b, 26c such that the output of each pedal sensors 22, 24 is fed to one or more of the central controllers 26a, 26b, 26c. The system 10 further includes a pedal feel emulator ("PFE") 27 which may include one or more of the central controllers 26a, 26b, 26c. The PFE 27 may also include a mechanical component, such as a spring and/or damper (schematically shown as component 23) to provide mechanical feedback to a driver pressing on the brake pedal 21.

Each central controller 26a, 26b, 26c may be or include any of a wide variety of controllers, microcontrollers, electronic control units ("ECU"), processors, chips, logic circuitry, or the like, but are termed "controllers" herein to encompass all of these terms and structures. In the illustrated embodiment, central controller 26a receives input from one of the pedal force sensors 24 and central controller 26b receives input from the other pedal force sensor 24. Central controller 26b also receives input from one of the pedal position sensors 22 regarding the position or displacement of the brake pedal 21, and central controller 26c receives input from the other pedal position sensor 22. It should be understood that the particular couplings of the sensors 22, 24 to the various central controllers 26a, 26b, 26c may vary from that shown in FIG. 1, and various other arrangements and coupling/attachment of pedal sensors 22, 24 may be used without departing from the scope of the invention.

The central controllers 26a, 26b, 26c and/or PFE 27 may process the input provided by the pedal sensors 22, 24 to determine the braking action that is requested by the driver. Although the illustrated embodiment shows four pedal sensors 22, 24 coupled to the three central controllers 26, the number and type of pedal sensors 22, 24 and their connections to the central controllers 26 may vary, and more or less central controllers 26 may be utilized as desired.

Each of the central controllers 26 may provide a processed output of the pedal sensors 22, 24 to a bus system or network 30, which in turn communicates the processed information to a plurality of remote controllers 34a, 34b, 34c, 34d. The bus 30 may be any of the wide variety of means or structures for communicating data, such as a time triggered protocol ("TTP") bus or a FLEXRAY® data bus line sold by DaimlerChrysler of Stuttgart Germany (and which is believed to incorporate standards set by a consortium of many members), or any of a wide variety of communications systems, connections or connecting systems. The bus or network 30 may be or include any of a wide variety of communications networks, bus systems or configurations, asynchronous and synchronous communications systems and protocols, and the like, as well as combinations thereof. In addition, the communications networks and signal interfaces of the bus or network 30 may take any form capable of transferring a signal or data, including electrical, optical, or radio signals and may include and employ various technologies in its implementation, such as wired, wireless, fiber optic, and the like, including combinations thereof. Although only a single communication bus 30 is illustrated, the bus should have sufficient capacity to provide the required data transmission and may actually include multiple busses or sub-busses.

Each remote controller 34 may be or include any of a wide variety of controllers, microcontrollers, electronic control units, processors, chips, logic circuitry, or the like, but is termed a "controller" herein to encompass all of these terms and structures. Each of the remote controllers 34 may be located at, located adjacent to, or control an associated brake subsystem 18. For example, remote controller 34a is located at and/or control the brake for the left rear wheel and thus is designated the "LR Controller" in the drawings. Remote controller 34b is designated the right rear ("RR") controller, remote controller 34c is designated the left front ("LF") controller, and remote controller 34d is designated the right front ("RF") controller.

The distance between each remote controller 34 and its associated brake subsystem 18 may be quite small. The distance between each remote controller 34 and its associated brake system 18 may be less than the distance between each remote controller 34 and any of the central controllers 26, or less than the distance between any two remote controllers 34, or less than the distance between that remote controller and any other controller (remote or central). Each central controller 26 may be generally centrally located such that a distance between that central controller 26 and any one of the remote controllers 34 is always less than the longest distance between any two remote controllers 34. Alternately, the remote controllers 34 may form a generally closed shape (i.e. a rectangle in the illustrated embodiment), and the central controller 26 may be fully or partially located in the closed shape formed by the remote controller 34.

In the illustrated embodiment, each remote controller 34 is located adjacent to or associated with a wheel 15 to control the brake forces applied to that wheel 15. In particular, each remote controller 34 is coupled to an associated, adjacent motor 20 and/or caliper 19 to control displacement of the caliper 19 and thereby the braking applied to an associated rotor 16/wheel 15. Thus each remote controller 34 is directly coupled to the associated brake subsystem 18. In contrast, the central controllers 26a, 26b and 26c are not directly coupled to any of the brake subsystems 18, and instead the bus 30 is located between the central controllers 26a, 26b, 26c and the brake subsystems 18.

Each brake subsystem 18 may further include or be coupled to a wheel speed sensor 36 which detects the rotational speed of the associated wheel 15, with each wheel speed sensor 36 being operatively coupled to an associated remote controller 34. Each remote controller 34 may receive outputs from the central controllers 26a, 26b, 26c via the bus 30, and may carry out various calculations and provide data or information to the other remote controllers 34 and/or to the central controllers 26a, 26b, 26c via the bus 30. For example, each remote controller 34 may be configured to carry out a base or basic brake pedal control function, which involves receiving the processed output from the pedal sensors 22, 24 via the central controllers 26a, 26b, 26c, determining the deceleration or braking action requested by the driver, and determining the action required to provide the desired deceleration.

For example, the base brake function may involve determining the force to be applied by the caliper 19 to its brake pad (or from the brake pad to the rotor 16) to achieve the braking/deceleration requested by the driver. Each remote controller 34 may include a base brake module 38 to process the output of the central controllers 26a, 26b, 26c and determine how to control or operate the associated motor 20 and/or caliper 19. Each base brake control module 38 (as well as the other modules discussed below) may be software, lines of code, hardware (i.e., circuitry) or the like inside or contained within the associated remote controller 34, and therefore may or may not be physically isolated in or separable from the associated remote controller 34, but is shown as a discrete module for illustrative purposes. Each module may be discrete from the other modules such that a module can be utilized or modified without causing or requiring any interaction with or modifications to the other modules.

Each remote controller 34 may also include a dynamic rear proportioning ("DRP") control function module 40, which is or includes software, lines of code, hardware or the like to calculate adjustments in the applied braking force to create balanced braking of the vehicle 12 (i.e. balance in the front-to rear direction and/or between the front and rear brakes in a well known manner). Each remote controller 34 may also include a clamp force module 41 which is or includes software, lines of code, hardware or the like that is configured to carry out clamp force control analysis. Clamp force control analysis involves processing the input provided from the driver (i.e., via the sensors 22, 24) and the output of the base brake module 38 to determine how to control the associated motor 20 to apply the desired force by the caliper 19 to the brake pad (or the force applied from the brake pad to the rotor 16) i.e., how many rotations of the motor 20 are required.

Each remote controller 34 may also include a voting module 42 which is or includes software, lines of code, hardware or the like which communicates to the other remote controllers 34 and central controllers 26 via the bus 30, and which receives output from the voting module 42 of the other controllers 26, 34 via the bus 30. In addition, or in the alternative, each central controller 26 may also include a voting module (not shown). The voting module 42 of each remote controller 34 may communicate or transfer data from the other modules 38, 40, 41 of the associated controller 34, and may receive data from the various modules of the other controllers 26, 34. Similarly, the voting module of each central controller 26 may communicate or transfer data from the other modules 44, 46, 48, 50 of the associated controller 26, and may received data from the various modules of the other controllers 26, 34. The voting modules provide redundancy control of the system 10 of the present invention and allow "consensus building" in determining control over the brake subsystems 18.

For example, for each function carried out by each remote controller 34 (i.e., base brake control, dynamic rear proportional control, force control and any other functions), each remote controller 34 may carry out these functions/calculations for its associated wheel/brake subsystem 18, as well as the three other wheels/brake subsystems 18. As an illustrative example, upon receiving inputs from the three central controllers 26a, 26b, 26c, the right front remote controller 34d will utilize its base brake control module 38 to determine the force required to match the driver input based upon the sensed brake pedal 21 travel and force. The remote controller 34d will then utilize the force control module 41 to determine how many rotations of its associated motor 20 is required to apply the desired clamping force. Utilizing the voting module 42, the output of the base brake control module 38 and force control module 41 of the right front remote controller 34d is then communicated to the other remote controllers 34a, 34b, 34c via the bus 30.

The other remote controllers 34a, 34b, 34c will have also calculated the required force and motor control for the right front wheel/brake subsystem using their associated base brake control modules 38 and clamp force modules 41. The system 10 then undertakes a voting process to determine whether the required force and motor control for the right front wheel/brake, as calculated by each of the four remote controllers 34, agree in a "voting" process. If all four remote controllers 34 agree, or three out of the four remote controllers 34 agree, then the agreed-upon values are utilized for further processing (i.e., signals are forwarded to the motor 20 of the brake subsystem 18 for the right front wheel/brake subsystem to implement the braking). If only two of the four remote controllers 34 agree, then the agreed-upon values may be utilized. If there is no agreement by any of the remote controllers 34, then the system and/or remote controller 34d is shut down.

This process is then repeated, or carried out simultaneously, for the other three wheels of the vehicle 12 to determine what sort of braking action is required at each wheel/brake subsystem. Various other modules throughout the vehicle 12 may also monitor the voting process and may have the capability to shut down certain ones of the remote controllers 34 if the remote controllers 34 operate erroneously.

Besides processing the input from the pedal sensors 22, 24, each of the central controllers 26a, 26b, 26c may also carry out higher-level vehicle/braking control calculations. For example, each of the central controllers 26a, 26b, 26c may include an anti-lock braking systems ("ABS") module 44 for determining whether anti-lock brake controls should be instituted at any or each of the four wheel/brake subsystems, as well as algorithms for instituting ABS control in a well-known manner. Thus, the output of each of the wheel speed sensors 36 may be fed to the central controllers 26a, 26b, 26c via the bus 30, and the central controllers 26a, 26b, 26c can then track the slip status of the wheels 15 to determine whether the ABS algorithm should be activated. Similar to the voting process utilized by the remote controllers 34, if there are multiple central controllers 26, the central controllers 26 may communicate their outputs and determinations to each other via the bus 30 and utilize a voting process or algorithm to determine whether ABS action is required, and if so, how such ABS action is to be instituted. Thus, although in the illustrated embodiment there are only three central controllers 26a, 26b, 26c (as compared to four remote controllers 34) relatively high redundancy and robustness is still provided.

Each central controller 26 may include a traction control system ("TCS") module 46 for determining whether and how traction control steps should be implemented. When utilizing the TCS system, it is generally desired to apply brake pressure to an excessively spinning wheel during acceleration in a well-known manner. Each central controller 26 may also include an advanced functions module 48 for carrying out various other vehicle control or stability enhancements which may include, for example, vehicle stability enhancement ("VSE"), also referred to as an electronic stability program ("ESP"). VSE involves determining the desired heading of the vehicle 12 through the use of acceleration sensors, steering angle sensors, yaw rate sensors, brake position, brake force, etc. to determine the driver's intended heading and controlling the brake subsystems 18 to direct the vehicle 12 in a manner to match the driver's intent when corrective action is needed in a well known manner. The advanced functions module 48 may also be configured to implement steering control, suspension control, power control, hill hold, panic assist, cornering braking control, dynamic/static parking brake control, and adaptive cruise control or other similar vehicle control functions, all of which are in widespread use in a well-known manner and may be part of a drive-by-wire system.

The calculations of processing requirements of the system 10 are distributed between the remote controllers 34 and the central controllers 26 and their various modules 38, 40, 41, 42, 44, 46, 48, and the outputs between the various remote controllers 34 and central controllers 26 are communicated to each other via the bus 30. The distribution of the computing functions or modules may be varied from that shown herein. For example, broadly speaking, any of the base brake modules 38, dynamic rear proportioning modules 40, clamp force modules 41, voting modules 42, ABS modules 44, TCS modules 46 or advanced function modules 48 may be located at any of the remote 34 or central controllers 26, in nearly any desired configuration or distribution. However, it may be desired that certain braking determiners, such as the base brake modules 38, force control modules 41 and voting modules 42 remain at a remote controller 34 such that each remote controller 34 has a base brake module 38, force control module 41 and voting module 42. It may also be desired that each remote controller 34 and/or each central controller 26 have or include at least a rudimentary ABS module.

The data acquisition functions of the central controllers 26 (i.e. the portions that receive and/or process the input from the pedal sensors 22, 24) may also be desired to remain on the central controllers 26. Various other higher-level or non-location-specific modules, such as the DRP modules 40, ABS modules 44, TCS modules 46, advanced function modules 48 and the like may be located either on the central 26 and/or remote controllers 34 in nearly any desired distribution so long as sufficient redundancy is provided. Thus, in one embodiment the system of the present invention allows flexibility in the placement of the various modules so that processing requirements, physical attributes of the system, etc. can be optimized.

Through-put of a controller is typically primarily determined by three factors: 1) how much data can be transmitted in parallel, in bits (i.e. 16 bits); 2) the system clock frequency, in MHz (i.e. 25 MHz); and 3) the number of clock cycles for a given instruction. It may be desired that the computing power, processing capability or through-put required by each of the controllers (i.e., central controllers 26 and remote controllers 34) be relatively even to ensure an even distribution of through-put or processing requirements. The DRP modules 40, ABS modules 44, TCS modules 46 and advanced function modules 48 may be located in various ones of the controllers 26, 34 to provide an even distribution of processing capabilities or through-put requirements. In this manner, the various modules may be arranged such that when relatively even through-put requirements are attained, a single type of controller (i.e., such as a sixteen bit controller, thirty-two bit controller, sixty-four bit controller, one hundred twenty eight bit controller, etc.) may be utilized as both the central controllers 26 and remote controllers 34. Thus in the illustrated embodiment, seven sixteen bit controllers may be used as the controllers 26, 34.

If only a single size or type of controller is utilized as the remote controllers 34 and central controllers 26 (in contrast to having differing types of controllers in the system 10), assembly and repair of the system 10 is greatly facilitated. In addition, when a vehicle manufacturing company or parts manufacturing company assembles the system 10, economies of scale may be utilized to purchase an increased number of a single type of controller, as opposed to purchasing two different types of controllers. Furthermore, if only a single (i.e., sixteen bit) controller is utilized as each of the controllers 26, 34, and these controllers are used efficiently to maximize their capabilities, the use of more expensive (i.e., thirty-two bit) controllers can be avoided.

In some situations, it may not be feasible or practical to utilize the same type of controllers as both the remote controller 34 and the central controllers 26. In particular, the system may require increased processing capabilities beyond that which can be supplied by, for example, seven sixteen bit controllers. In this case, increased capacity controllers may be utilized as the central controllers 26. For example, some or all of the central controllers 26 may be thirty-two bit controllers, and each of the remote controllers 34 may be sixteen bit controllers. Alternately all of the central controllers 26 may be thirty-two bit controllers, and some of the remote controllers 26 may be thirty-two bits and some may be sixteen bits. It may be advantageous to use the central controllers 26 as the higher capability controllers because the central controllers 26 are relatively protected and sheltered as compared to the remote controllers 34. In particular, because the remote controllers 34 are located relatively close to the vehicle wheels, the remote controllers 34 are more exposed to varying temperatures, road and vehicle debris, ambient conditions, etc. Thus, locating the higher-capability and more expensive controllers in a more protected location may provide a cost savings and greater redundancy. However, if desired, the remote controller(s) 34 may have a higher capability than the central controller(s) 26.

In addition, the system 10 of the present invention allows different ones of the modules to be distributed on different ones of the controllers 26, 34 in the desired manner. Thus the system allows the vehicle designers great flexibility in designing the brake system and its architecture.

The system described herein includes the use of various ABS modules 44, TCS modules 46, advanced function modules 48, power distribution modules 50, base brake modules 38, dynamic rear proportioning modules 40, force control modules 41 and voting modules 42. However, the invention is not limited to use with these specific modules. In particular, any module which is configured to carry out a specific vehicle control function or a vehicle communication function can be utilized in the system of the present invention.

Figure 2:
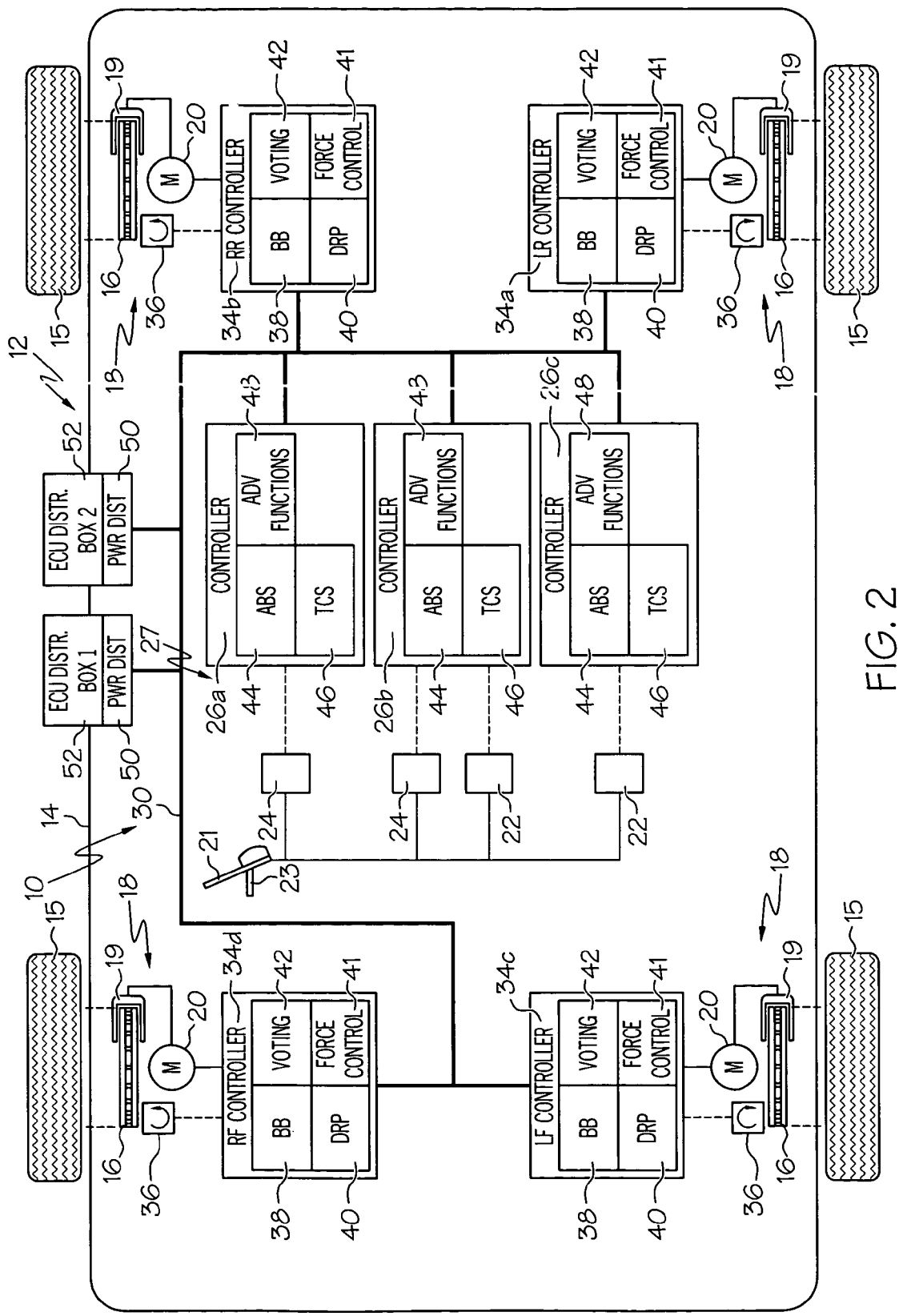
FIG. 2 is a schematic view of another embodiment of the system of the present invention.

In the embodiment shown in FIG. 1, power distribution functions are provided to various ones of the central controllers 26. Thus, in the illustrated embodiment each of the two central controllers 26a, 26b includes a power distribution module 50 which is or includes software, lines of code, hardware or the like which distributes electrical power to various ones of the central controllers 26 and remote controllers 34. Although it may be possible to locate the power distribution modules 50 at various ones of the controllers 26, 34, in general it may be desired to locate the power distribution modules 50 on the central controllers 26. The presence of at least two power distribution modules 50 and proper set-up of the power distribution modules 50 ensures that power can be distributed to all the controllers 26, 34 should one of the power distribution modules 50 fail to function. FIG. 2 illustrates an alternate embodiment wherein the system 10 includes a pair of external controllers 52, each external controller 52 having a power distribution module 50 located thereon. Each external controller 52 is coupled to the bus 30 to allow the external controller 52 to carry out their power distribution functions.

Having described the invention in detail and by reference to the preferred embodiments, it will be apparent that modifications and variations thereof are possible without departing from the scope of the invention.

What is claimed is:

1. A braking system for a vehicle having a plurality of wheels comprising:
   a brake subsystem associated with each of the wheels of the vehicle;
   a brake pedal for receiving a force from a driver;
   a plurality of sensors in communication with said brake pedal for sensing a driver input to said brake pedal;
   a plurality of remote controllers electrically connected to one another with each remote controller being associated with one of said brake subsystems for calculating braking functions of the associated brake subsystem and for calculating braking functions of the other brake subsystems;
   a plurality of central controllers electrically connected to said sensors for receiving said driver input and electrically connected to one another for processing said driver input and electrically connected to said remote controllers for sending said processed driver input to said remote controllers wherein each of said remote controllers has no greater processing capacity than said central controllers;
   said plurality of sensors including a pair of pedal force sensors for sensing the force being applied to said brake pedal and a pair of pedal position sensors for sensing a displacement of said brake pedal in response to the force; and
   said plurality of central controllers including a first central controller electrically connected to one of said pedal force sensors and a second central controller electrically connected to the other of said pedal force sensors and one of said pedal position sensors and a third central controller electrically connected to the other of said pedal position sensors.

2. The system of claim 1 wherein said central controllers are configured to carry out braking functions other than calculating basic braking functions.

3. The system of claim 2 wherein said central controllers are configured to carry out at least one of vehicle stability functions, vehicle control functions, or pedal feel emulator functions.

4. The system of claim 2 wherein said central controllers are configured to carry out at least one of steering control, suspension control, power control, hill hold, panic assist, cornering braking control, dynamic/static parking brake control, or adaptive cruise control.

5. The system of claim 1 wherein each remote controller is located adjacent to an associated brake subsystem.

6. The system of claim 1 wherein a distance between each remote controller and its associated brake subsystem is less than a distance between that remote controller and any of said central controllers.

7. The system of claim 1 wherein said central controllers are generally centrally located such that a distance between any of said central controllers and any of said remote controllers is always less than the longest distance between any two remote controllers.

8. The system of claim 1 wherein each remote controller has the same processing capability.

9. The system of claim 1 wherein said remote controllers and said central controllers each have the same processing capability.

10. The system of claim 1 further comprising a bus system operatively coupling each of said central controllers and each of said remote controllers together.

11. The system of claim 1 wherein each of said remote controllers is configured to calculate basic braking functions for the associated brake subsystem and for each of the other brake subsystems such that each remote controller is configured to receive a processed input from said central controllers relating to the braking action requested by a driver and to determine the braking action required to provide the requested braking action.

12. The system of claim 1 wherein each of said remote controllers is configured to provide an output that directly controls movement of a caliper for the associated brake subsystem.

13. The system of claim 1 wherein each of said central controllers and said remote controllers includes a voting module to communicate information from the associated controller to the other controllers.

14. The system of claim 1 wherein said system includes a plurality of basic brake modules, a plurality of anti-lock braking system modules, and a plurality of traction control modules wherein said basic brake modules, anti-lock braking system modules, and traction control modules are distributed across said remote controllers and said central controllers.

15. The system of claim 1 wherein each remote controller is directly coupled to an associated brake subsystem and wherein each of said central controllers are not directly coupled to any of said brake subsystems.

16. The system of claim 1 wherein the system includes a pair of external controllers operatively coupled to said central controllers, each external controller including a power distribution module for said central controllers and said remote controllers.

17. The system of claim 1 wherein said processing capability is determined at least partially by a through-put of that controller.

18. The system of claim 1 wherein
said central controllers and said remote controllers include a plurality of functional modules for processing said driver inputs wherein at least one of the functional modules is disposed in each of said central controllers and at least one functional module is disposed in each of said plurality of remote controllers.

19. The system of claim 18 wherein each functional module is software, lines of code, or hardware that is configured to carry out a specific vehicle control function or a specific vehicle communication function.

20. The system of claim 18 wherein said plurality of functional modules include at least one of an ABS module, a TCS module, a dynamic rear proportional control module, a force control module, a base brake control module, a power control module, a voting module or an advanced function module.

21. The system of claim 20 wherein said advanced function module is configured to implement at least one of steering control, suspension control, power control, hill hold, panic assist, cornering braking control, dynamic/static parking brake control, or adaptive cruise control.

22. The system of claim 18 wherein said plurality of functional modules includes at least one ABS module located on one of said plurality of remote controllers or said central controllers, at least one TCS module located on one of said plurality of remote controllers or said central controllers, and at least one dynamic rear proportional control module located on one of said plurality of remote controllers or said central controllers.

23. The system of claim 18 wherein said plurality of functional modules includes a basic brake module located on each of said plurality of remote controllers.

24. The system of claim 23 wherein said plurality of functional modules includes at least one ABS module located on each of said central controllers.

25. The system of claim 24 wherein said plurality of functional modules includes at least one TCS module located on one of said plurality of remote controllers or said central controllers, and at least one dynamic rear proportional control module located on one of said plurality of remote controllers or said central controllers.

26. The system of claim 18 further comprising a bus system operatively coupling said central controllers and remote controllers together, wherein each of said central controllers and said remote controllers includes a voting module to communicate information from the associated controller to the other controllers.

27. The system of claim 18 wherein each remote controller has about the same or less processing capability than said central controllers.

28. The system of claim 18 wherein each functional module is modifiable without causing or requiring any modification to the other functional modules.

29. A method of operating a braking system in a vehicle having a brake pedal and a plurality of wheels,
providing a brake subsystem associated with each of the wheels for controlling the associated wheel,
providing a remote controller associated with each brake subsystem,
providing a first central controller and a second central controller and a third central controller with each of the central controllers being in electrical communication with each of the remote controllers,
providing a pair of pedal force sensors with one of the pedal force sensors being in electrical communication with the first central controller and the other of the pedal force sensors being in electrical communication with the second central controller,
providing a pair of pedal position sensors with one of the pedal position sensors being in electrical communication with the second central controller and the other of the pedal position sensors being in electrical communication with the third central controller,
applying a force to the brake pedal of the vehicle to displace the brake pedal,
measuring the force being applied to the brake pedal with a pair of pedal force sensors and generating a force signal with each of the pedal force sensors and sending the force signals to the first and second central controllers,
measuring the displacement of the brake pedal with a pair of pedal position sensors and generating a displacement signal with each of the pedal position sensors and sending the displacement signals to the second and third central controllers, processing the force signal with the first central controller and the second central controller, processing the displacement signal with the second central controller and the third central controller, and calculating braking functions of the associated brake subsystem with each of the remote controllers and calculating braking functions of each of the other brake subsystems with each of the remote controllers.

* * * * *

UNITED STATES PATENT AND TRADEMARK OFFICE
CERTIFICATE OF CORRECTION

| | | |
|---|---|---|
| PATENT NO. | : 7,826,952 B2 | Page 1 of 1 |
| APPLICATION NO. | : 11/101318 | |
| DATED | : November 2, 2010 | |
| INVENTOR(S) | : Robert Disser et al. | |

It is certified that error appears in the above-identified patent and that said Letters Patent is hereby corrected as shown below:

Column 6, Line 20: "calculations" should read --calculation--.

Signed and Sealed this
Twenty-fifth Day of January, 2011

David J. Kappos
*Director of the United States Patent and Trademark Office*